United States Patent [19]
Suzuki et al.

[11] Patent Number: 5,901,567
[45] Date of Patent: May 11, 1999

[54] ABSORPTION REFRIGERATING/HEATING APPARATUS

[75] Inventors: Akira Suzuki; Manabu Kagawa; Tooru Fukuda; Toshimitsu Takaishi; Mitsuru Ishikawa; Hidetaka Kayanuma, all of Saitama, Japan

[73] Assignee: Honda Giken Kogyo Kabushiki Kaisha, Tokyo, Japan

[21] Appl. No.: 08/978,274

[22] Filed: Nov. 25, 1997

[30] Foreign Application Priority Data

Dec. 18, 1996 [JP] Japan .................................. 8-354168
Mar. 28, 1997 [JP] Japan .................................. 7-094812

[51] Int. Cl.[6] .................................................. F25B 15/00
[52] U.S. Cl. .................................... 62/324.2; 62/476
[58] Field of Search .............................. 62/476, 324.2, 62/497, 495, 101

[56] References Cited

U.S. PATENT DOCUMENTS

| 4,413,479 | 11/1983 | Rojey ...................................... 62/324.2 |
| 4,464,907 | 8/1984 | Mack et al. .............................. 62/101 |
| 4,593,531 | 6/1986 | Fujimoto .................................. 62/101 |
| 4,667,485 | 5/1987 | Ball et al. ................................ 62/476 |
| 5,749,244 | 5/1998 | Murayama et al. ....................... 62/476 |

FOREIGN PATENT DOCUMENTS

| 1-47714 | 10/1989 | Japan . |
| 6-2980 | 1/1994 | Japan . |
| 406117722 | 4/1994 | Japan .................................. 62/324.2 |
| 6-97127 | 11/1994 | Japan . |
| 7-96977 | 10/1995 | Japan . |
| 9-318183 | 12/1997 | Japan . |

Primary Examiner—William Doerrler
Attorney, Agent, or Firm—Armstrong, Westerman, Hattori, McLeland & Naughton

[57] ABSTRACT

An absorption refrigerating/heating apparatus in which a refrigerant vapor generated in the evaporator (1) is absorbed to produce absorption heat by the absorbent in an absorber (2). There are first tube for chilled water in the evaporator, a second tube for cooling water in the absorber, a third tube in an indoor unit (15), and a forth tube in a sensible heat exchanger. The first tube and the second tube are respectively connected to the third tube and the fourth tube in a cooling operation, while to the fourth tube and the third tube respectively in a heating operation.

13 Claims, 4 Drawing Sheets

ABSORPTION REFRIGERATING/HEATING APPARATUS

BACKGROUND OF THE INVENTION

1. Field of the Invention

The present invention relates to an absorption refrigerating/heating apparatus or airconditioner and particularly, an absorption refrigerating/heating apparatus for heating at high efficiency with a heat pump in an ordinary heating mode and, when the outside air temperature is too low to pump up heat, shifting to a direct flame heating mode to maintain the heating capacity to a desired level as well as permitting simple switchover between the refrigerating mode, the thermodynamic heating mode, and the direct flame heating mode.

Also, the present invention is directed towards an absorption refrigerating/heating apparatus which improves the start of shifting from the direct flame heating mode to the thermodynamic heating mode.

2. Description of the Related Art

As absorption type refrigerating apparatuses have commonly been used for only refrigerating, they are now arranged for not only refrigerating action but also carrying out a thermodynamic heating action in which heat pumped up by the absorber is used for heating. In such a thermodynamic heating action, however, the efficiency of pumping up heat from the outside air is declined when the temperature of the outside air drops. A modification is provided for shifting from the thermodynamic heating action to the direct flame heating mode when the outside air temperature drops to some lower limit.

Disclosed in Japanese Patent Publication Nos. Hei 1-47714 and Hei 7-96977 and Japanese Patent Laid-open Publication No. Hei 6-2980 are such a modified absorption heat-pump apparatus and a refrigerating/heating apparatus. An absorption refrigerating/heating apparatus which performs in any of three modes; refrigerating, thermodynamic heating, and direct flame heating is depicted in Japanese Patent Publication No. Hei 6-97127.

Those conventional absorption refrigerating/heating apparatuses of air-cooling type are complicated in the construction where switching is needed from refrigerating mode to heating mode and vice versa and will thus hardly be feasible in practice.

For example, to shift between the refrigerating mode and the thermodynamic heating mode in the apparatus disclosed in the Patent Publication No. Hei 6-97127, the passage for a refrigerant or an absorbent solution has to be switched. This causes undesired mixture of the absorbent solution with the refrigerant. For implementation, therefore, the switching between the three modes of cooling, thermodynamic heating, and direct flame heating can only be realized with the use of intricate mechanisms. Although the apparatus disclosed in the Patent Publication No. Hei 1-47714 employs four-way valves for switching between the refrigerating mode and the heating mode to form a simplified passage switching mechanism, the switching between the refrigerant passage and the absorbent solution passage is inevitable. Accordingly, the mixture of the refrigerant with the absorbent solution will occur hence requiring a length of time to return back to an expected level of performance after the switching.

SUMMARY OF THE INVENTION

It is a primary object of the present invention to provide an absorption refrigerating/heating apparatus for shifting between the thermodynamic heating mode and the direct flame heating mode with a simple construction while the refrigerant and the absorbent solution are separated from each other during the mode shifting action.

It is another object of the present invention to provide an absorption refrigerating/heating apparatus for maintaining a desired amount of the refrigerant, when the operation is shifted from the direct flame heating mode to the thermodynamic heating mode, to improve the starting characteristic of the thermodynamic heating action.

An absorption refrigerating/heating apparatus according to the present invention comprises an evaporator for accommodating a refrigerant; an absorber for accommodating a solution which includes an absorbent for absorbing a refrigerant vapor generated in the evaporator and producing absorption heat; a regenerator for heating a portion of the solution to extract the refrigerant vapor for recovery of the concentration of the absorbent in the solution; a condenser for condensing the refrigerant vapor extracted and passing the refrigerant to the evaporator; a first tube mounted across the evaporator for passing a flow of chilled water which is cooled down with the refrigerant; a second tube mounted across the absorber and the condenser for passing a flow of cooling water which is heated by the solution in the absorber and the refrigerant vapor in the condenser; an indoor unit equipped in a room to be airconditioned: a third tube extending across the indoor unit for selectively passing one of the chilled water and the cooling water; a sensible heat exchanger for exchanging heat between the other of the chilled water and the cooling water and the outside air; a fourth tube extending across the sensible heat exchanger for selectively passing the other of the chilled water and the cooling water; a first four-way valve having first through fourth openings each connected to each of one ends of the first through fourth tubes; and a second four-way valve having first through fourth openings each connected to each of the other ends of the first through fourth tubes. And the first and second four-way valves are switched for respectively connecting the first tube and the second tube to the third tube and the fourth tube in a refrigerating mode, while to the fourth tube and the third tube respectively in a thermodynamic or a direct flame heating mode.

The apparatus may be provided with a return passage which fluidly connects between the condenser and the regenerator, thus allowing the refrigerant vapor generated in the regenerator to circulate from the condenser via the return passage to the regenerator to continue the heating operation in the direct flame heating mode when the thermodynamic heating is disabled.

In an absorption refrigerating/heating apparatus according to the present ionvention, to achieve another object mentioned above, having an evaporator for accommodating a refrigerant, an absorber for accommodating a solution which includes an absorbent for absorbing a refrigerant vapor generated in the evaporator, a regenerator for heating a portion of the solution to extract the refrigerant vapor for recovery of the concentration of the absorbent in the solution, and a condenser for condensing the refrigerant vapor extracted and passing it to the evaporator, in which the operation is selected from a refrigerating mode a thermodynamic heating mode and a direct flame heating mode, the improvement comprising: a return passage for directly circulating back the refrigerant from the condenser to the regenerator; and a switching means for opening the return passage to form a closed circulation loop of the refrigerant and to shift the operation to the direct flame heating mode for heating the cooling water running across the condenser with the circulated refrigerant, in which the refrigerant circulation outlet connected to the return passage from the condenser to the regenerator is located higher than another refrigerant outlet for passing back the refrigerant from the condenser to the evaporator.

According to the present invention, the apparatus may further comprise: a rectifier which is mounted on the top of the regenerator and consisting of a lower stripping stage and an upper enriching stage for further separating the absorbent solution from the refrigerant vapor generated in the regenerator, so that while the refrigerant vapor generated in the regenerator is passed through the rectifier to the condenser, the outlet of the return passage is located in a position which is lower than the refrigerant return outlet and higher than the stripping stage; a bleeding line may also be added for passing a portion of the refrigerant from the evaporator to the rectifier; and a means for almost fully opening the bleeding line in the direct flame heating mode to feed the refrigerant from the evaporator to the regenerator for decreasing the concentration of the absorbent in the solution in the regenerator to a lower level than that in the thermodynamic heating mode.

As the result, when the direct flame heating mode is selected, the refrigerant returned back to the regenerator can be drawn out from the refrigerant return outlet while a given amount of the refrigerant remains saved between the refrigerant return outlet and the bottom in the condenser.

The refrigerant vapor is further condensed in the rectifier. The circulating refrigerant from the condenser naturally falls on the rectifier due to a head or a difference in height between an inlet in the condenser and the outlet in the rectifier of the passage refrigerant return. The bleeding line feeds small amounts of the refrigerant to the regenerator from the evaporator to maintain a desired high purity of the refrigerant.

In the direct flame heating mode, the refrigerant is passed from the evaporator to the regenerator to decrease the concentration of the absorbent in the solution in the regenerator to a level which is lower than that in the thermodynamic heating mode. Consequently, the temperature of the solution required for maintaining the vapor pressure in the regenerator at a desired rate can be lowered thus decreasing the input of heat needed for heating the solution, improving the thermal efficiency of the apparatus and reducing the overall running cost in the direct flame heating mode.

DETAILED DESCRIPTION OF THE PREFERRED EMBODIMENT

Figure 1:
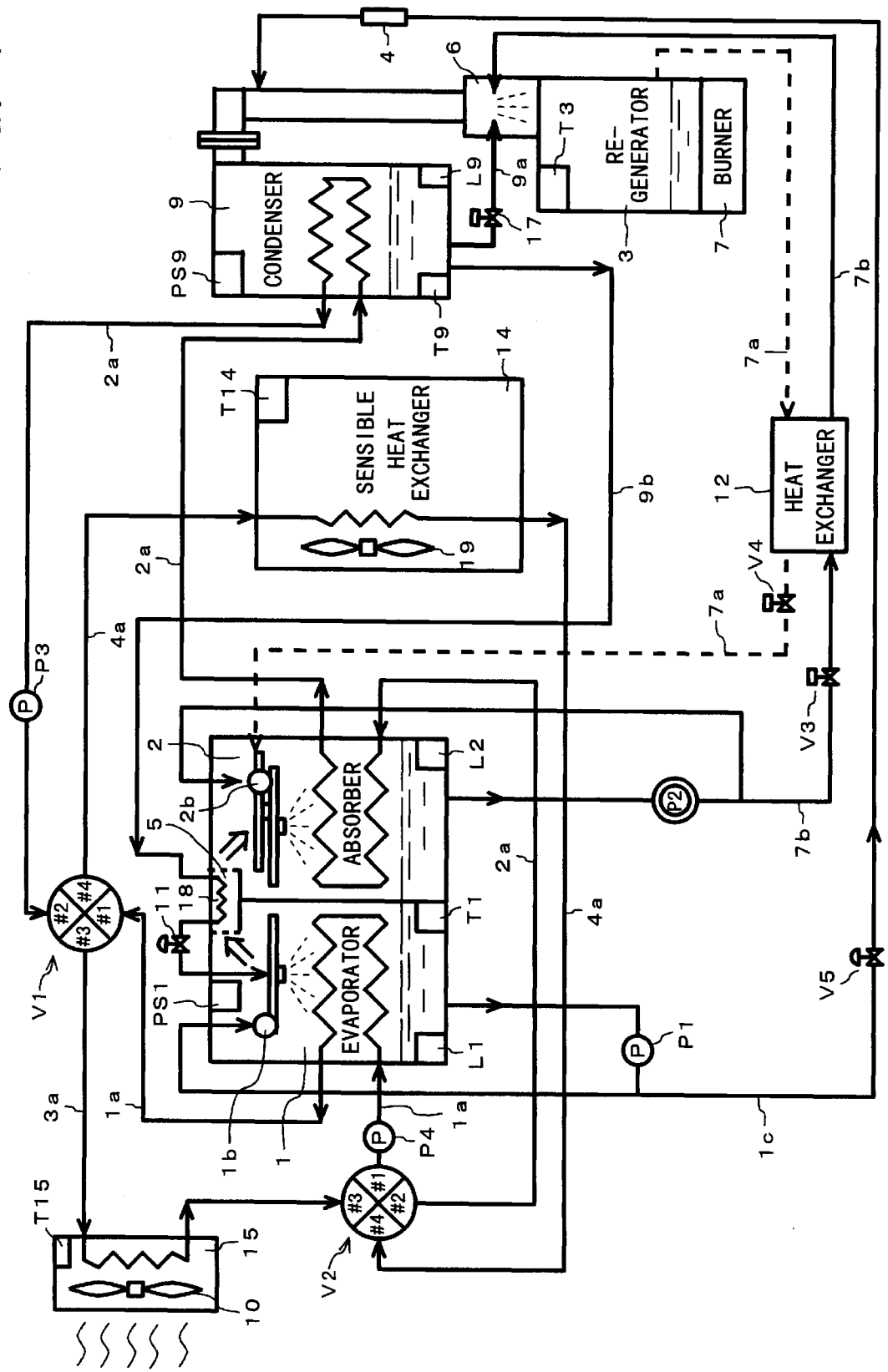
FIG. 1 is a diagram of a refrigerating/heating apparatus showing an embodiment of the present invention.

A preferred embodiment of the present invention will be described in more detail referring to the accompanying drawings. FIG. 1 is a block diagram showing a primary part of an absorption refrigerating/heating apparatus of the embodiment of the present invention. An evaporator 1 is filled with a refrigerant of fluoride alcohol such as trifluoroethanol (TFE), while an absorber 2 is filled with a solution of DMI derivative such as dimethyl-imidazolidinon which contains an absorbent. The refrigerant is not limited to fluoride alcohol but may be an appropriate agent of which nonfreezing range is wide. The solution also is not limited to the DMI derivative and it may be any other absorbent solution which is wide in the nonfreezing range, being higher than TFE in the atmospheric temperature boiling point and having an enough power to absorb TFE. For example, a combination of water and lithium bromide is unfavorable as the solution in the present embodiment, since water as a coolant may be frozen by temperature drop of the solution during the operation of the heating mode with the outside air temperature being about zero degree.

The evaporator 1 and the absorber 2 is fluidly communicated to each other by a (refrigerant) vapor passage 5. When the evaporator 1 is a kept under a low pressure condition of e.g. 30 mmHg, the refrigerant is vapored therein and moves via the vapor passage 5 into the absorber 2 as denoted by the double-line arrows. The refrigerant vapor is then absorbed by the absorbent in the absorber 2 thus causing an absorption freezing action. A cooler (or a heat exchanger) 18 is disposed in the vapor passage 5.

When a burner 7 is lit to heat up a regenerator 3 for increasing the concentration of the absorbent solution in the absorber 2, the absorbent absorbs the refrigerant vapor in the absorber 2 and the evaporation of the refrigerant in the evaporator 1 is accelerated hence cooling down the interior of the evaporator 1 with the latent heat of the refrigerant evaporation. The burner, the regenerator, and the concentration of the absorbent solution will be described later in more detail. A tube 1a for passing a chilled water is mounted to run through the evaporator 1. The tube 1a is connected at one end (the exit side in the embodiment shown) to the No. 1 opening of a first four-way valve V1 and at the other end (the entrance side in the embodiment) to the No. 1 opening of a second four-way valve V2 (See FIGS. 2 and 3). The refrigerant is fed by the action of a pump P1 to a spraying means 1b mounted in the evaporator 1 for being sprayed over the tube 1a in which the chilled water runs. The refrigerant deprives the chilled water in the tube 1a of heat and turns to a vapor which passes via the vapor passage 5 into the absorber 2. Consequently, the temperature of the chilled water is more declined. The refrigerant in the evaporator 1 is supplied via a filter 4 to a rectifier 6, which will be explained later, as well as fed to the spraying means 1b. A flow valve V5 is mounted across a bleeding line or a passage 1c between the evaporator 1 and the filter 4. The chilled water running in the tube 1a may preferably be either an ethylene glycol or propylene glycol water solution.

As the refrigerant vapor or a vapor of fluoride alcohol is absorbed by the solution in the absorber 2, the absorption heat increases the temperature of the solution. The lower the temperature and the higher the concentration of the solution, the greater the absorbing capability of the solution will be. For attenuating the temperature increase of the solution, a tube 2a is provided in the absorber 2 for passing a flow of cooling water. The tube 2a is connected at one end (the exit side in the embodiment shown) via a condenser 9 and a pump P3 to the No. 2 opening of the first four-way valve V1 and at the other end (the entrance side) to the No. 2 opening of the second four-way valve V2.

Preferably, the cooling water running along the tube 2a is the same as the chilled water which runs across the tube 1a in properties or constitution.

The absorbent solution is fed by the action of the pump P2 to a spraying means 2b mounted in the absorber 2 for being sprayed over the tube 2a. Consequently, the solution is cooled down by the cooling water running along the tube 2a. Simultaneously, the cooling water deprives the solution of heat and its temperature will increase. As the solution in the absorber 2 has absorbed the refrigerant vapor, the concentration of the absorbent drops thus lowering the absorbing capability of the solution.

The diluted solution which has absorbed the refrigerant vapor in the absorber 2 is passed via a tube 7b and a control valve V3 to the rectifier 6 and the regenerator 3 as well as fed to the spraying means 2b by the pump P2. The regenerator 3 is provided with the burner 7 for heating up the diluted solution. The burner 7 may be a gas burner or any other heating means. The solution is heated by the burner 7 and the concentration of the absorbent is increased as the refrigerant vapor is separated. The resultant (concentrated) solution is returned via a tube 7a and a control valve V4 to the absorber 2 where it is sprayed over the tube 2a by the spraying means 2b and pump P2.

In the regenerator 3, when the diluted solution is heated by the burner 7, the refrigerant vapor is generated. The refrigerant vapor, when running upward in the rectifier 6, comes in direct contact with the absorbent solution falling down therein and can thus release a remaining small amount of the absorbent solution before it passes to the condenser 9. The refrigerant vapor is cooled down and liquefied by the condenser 9. The refrigerant of a liquid form is then passed through a tube 9b, a cooler 18, and a reducing valve (flow valve) 11 and returned back to the evaporator 1 for spraying from the spraying means 1b. The cooler 18 is a type of heat exchanger which heats up a mist of the refrigerant in the vapor from the evaporator 1 with the higher temperature refrigerant from the condenser 9 for accelerating the evaporation of the refrigerant mist and, on the other hand, cooling down the relatively higher temperature refrigerant which is then fed back to the evaporator 1.

Although the purity of the refrigerant fed back from the condenser 9 is fairly high in the evaporator 1, it may or must gradually be declined because a vary small amount of the absorbent in the circulated vapor is accumulated during a long period of the cycle operation. For recovering the purity of the refrigerant, a small portion of the refrigerant from the evaporator 1 is sent through the valve 5 and the filter 4 to the rectifier 6 where it is mixed with the refrigerant vapor from the regenerator 3. The filter 4 is used for preventing filler tubes of the rectifier 6 from being fouled with dirt and/or rust in the absorbent solution which may cause degradation of the functional operation.

A heat exchange 12 is provided in the middle way of the tubes 7a and 7b which respectively connect the absorber 2 and the rectifier 6. The absorbent solution at high concentration and high temperature which runs along the tube 7a from the regenerator 3 is subjected to a heat exchanging action of the heat exchanger 12 with the diluted solution which runs along the tube 7b from the absorber 2, hence being cooled before it is fed to the absorber 2 where it is sprayed. In reverse, the diluted solution is preheated by the action of the heat exchanger 12 and passed to the rectifier 6. This will surely improve the thermal efficiency in the apparatus. In addition, another heat exchanger (not shown) may be provided for transferring heat from the concentrated solution to the cooling water which runs along the tube 2a from the absorber 2 or the condenser 9. Accordingly, the temperature of the concentrated solution returned to the absorber 2 will be reduced further while the temperature of the cooling water will be increased.

A sensible heat exchanger 14 is also provided with a tube 4a for heat exchange between the cooling water or the chilled water and the outside air and an indoor unit 15 is provided with a tube 3a. The tubes 3a and 4a are connected at one end (the entrance side in the embodiment shown) to the No. 3 and No. 4 openings of the first four-way valve V1 respectively and at the other end (the exit side) to the No. 3 and No. 4 openings of the second four-way valve V2 respectively (See FIGS. 2 and 3). The indoor unit 15 is located in a room to be cooled or heated and includes a fan 10 used in common for blowing out either cooling air and heating air from its blowing window (not shown). The sensible heat exchanger 14 is normally placed in the outdoor and includes a fun 19 for forcedly exchanging of heat with the outside air.

Figure 2:
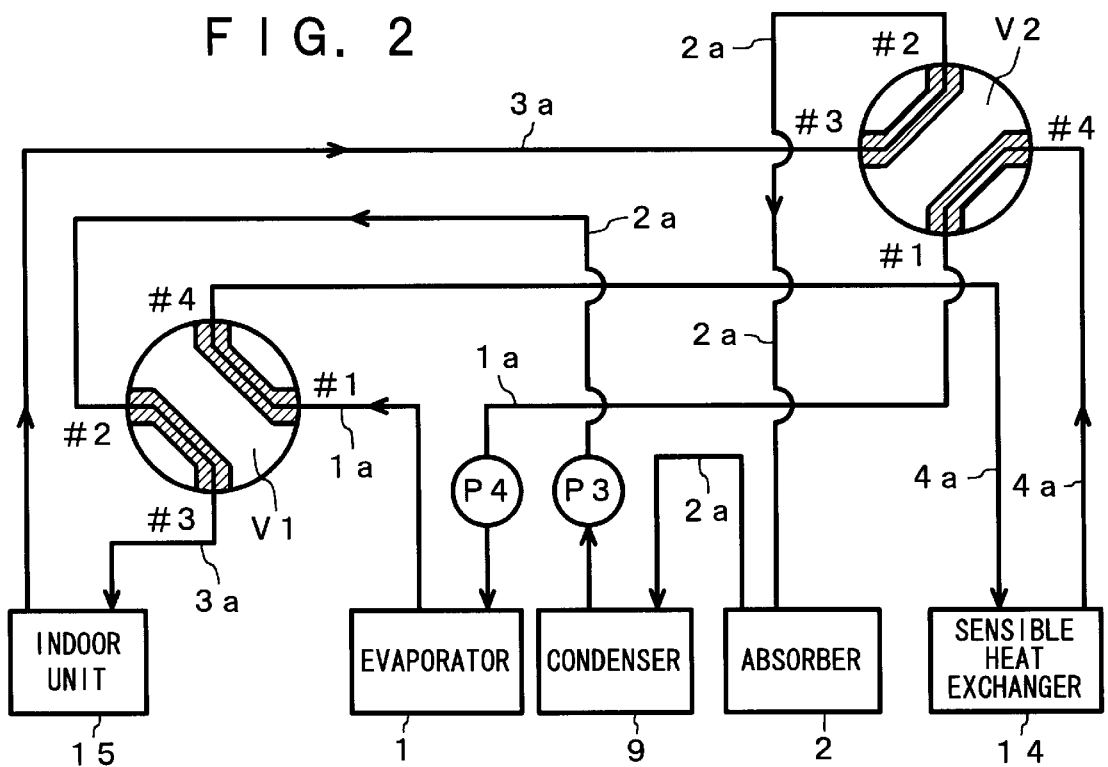
FIG. 2 is a diagram showing a piping arrangement with four-way valves operating the heating mode in the refrigerating/heating apparatus of the embodiment according to the present invention.

The letters T, L, and PS with numeral subscripts, in FIG. 2, represent a thermal sensor, a liquid level meter, and a pressure sensor respectively. Opening/closing or flow valves are denoted by V with numeral subscripts.

In operation of the heating mode with the heat pump action shown in FIG. 2, the first and second four-way valves V1 and V2 are actuated so that the No. 1 and No. 4 openings are communicated to each other and the No. 2 and No. 3 openings are communicated to each other.

Accordingly, the cooling water heated by the absorber 2 and the condenser 9 is passed from the tube 2a to the tube 3a in the indoor unit 15 for heating up the room.

When the outside air temperature extremely drops in the heating mode with the heat pump action, the sensible heat exchanger 14 hardly pumps up heat from the outside air thus lowering the heating capability. With such a very low temperature at the outside, the thermodynamic heating is halted and the refrigerant vapor generated in the regenerator 3 is circulated back from the condenser 9 to the regenerator 3 to enable the direct flame heating mode in which heat produced by the burner 7 is transferred with high efficiency to the cooling water which runs through the tube 2a in the condenser 9, thus contributing to raising the temperature of the cooling water and the increase of the heating capability in the apparatus.

For that purpose, a bypass passage 9a with a switching valve 17 are provided between the condenser 9 and the rectifier 6 (or the regenerator 3) as shown in FIG. 1. When the outside air temperature drops affecting the heating capability, the tube 9b from the condenser 9 to the evaporator 1 and the tubes 7a and 7b for passing the diluted solution and the concentrated solution between the absorber 2 and the regenerator 3 all are closed to stop the thermodynamic heating action. Simultaneously, the switching valve 17 is opened to directly circulate back the refrigerant vapor generated in the regenerator 3 through the condenser 9.

The switching from the thermodynamic heating action to the direct flame heating action for increasing the heating capability may automatically be controlled with the use of a thermal sensor T14 which is mounted in a proper location at indoor or outside (for example, adjacent to the sensible heat exchanger 14) so that when the temperature detected by the sensor T14 is lower than a predetermined degree, those valves are switched accordingly by a controller (not shown). The drop of the outside air temperature under the predetermined degree may be detected by checking the magnitude of thermal load. When the outside air temperature is low, the thermal load is also high, therefore the heating operation is shifted from the thermodynamic heating action to the direct flame heating mode if the thermal load is higher than a predetermined value. The calculation of the thermal load is disclosed in the specifications in Japanese Patent Application Nos. Hei 8-94714 and Hei 8-333056 as employed and incorporated herein as reference arts and will be explained briefly.

The magnitude of the thermal load for heating is calculated as an amount of heat required for expected heating from:

$$\text{Required heat amount } QE = QU + QV - QS - QM - QF \quad (1)$$

where QU is an amount of heat transfer due to a temperature difference between indoor and outdoor, QV is an amount of heat incoming through ventilation, QS is an amount of the radiant heat by direct sunlight, QM is an amount of the heat generated by human beings, pet animals and so on in the room, and QF is an amount of the heat generated by other heating bodies including a refrigerator. The transfer of heat Qu due to a temperature difference between the indoor and the outdoor is primarily defined by a combination of the outside air temperature, the room temperature, and the thermal conductivity of the room where the indoor unit 15 is located. Since the effect of the incoming heat QV, the radiant heat QS, the heat generated by the human beings in the room QM, and the other generated heat QF is as small as negligible, it is assumed that the required amount of heat QE is practically equal to QU. QU is calculated by:

$$QU = U(TR - TAM) \quad (2)$$

where U is a constant representing the thermal conductivity of the room where the indoor unit 15 is located, TR is the room temperature, and TAM is the outside air temperature. The constant U is determined depending on the size of the room, the structure of walls, and so on and may be registered in advance to the control device. The room temperature and the outside air temperature can be measured by an appropriate thermal sensor.

While the thermal load or required amount of heat QE is substantially determined by the transfer of heat QU due to a temperature difference between the indoor and the outdoor, the incoming heat QV, the radiant heat QS, the human-generating heat QM, and the other heat generated in the room QF may successfully be determined from the data of a series of experiments and statistics. For example, assuming that QV is calculated on the basis of the dimensions of the room, the door, and the windows, QS is calculated considering various locational and climate conditions, QM is calculated from the number and characteristics of family members, and QF is calculated with average home installations, the required amount of heat QE can be computed using a microcomputer.

Figure 3:
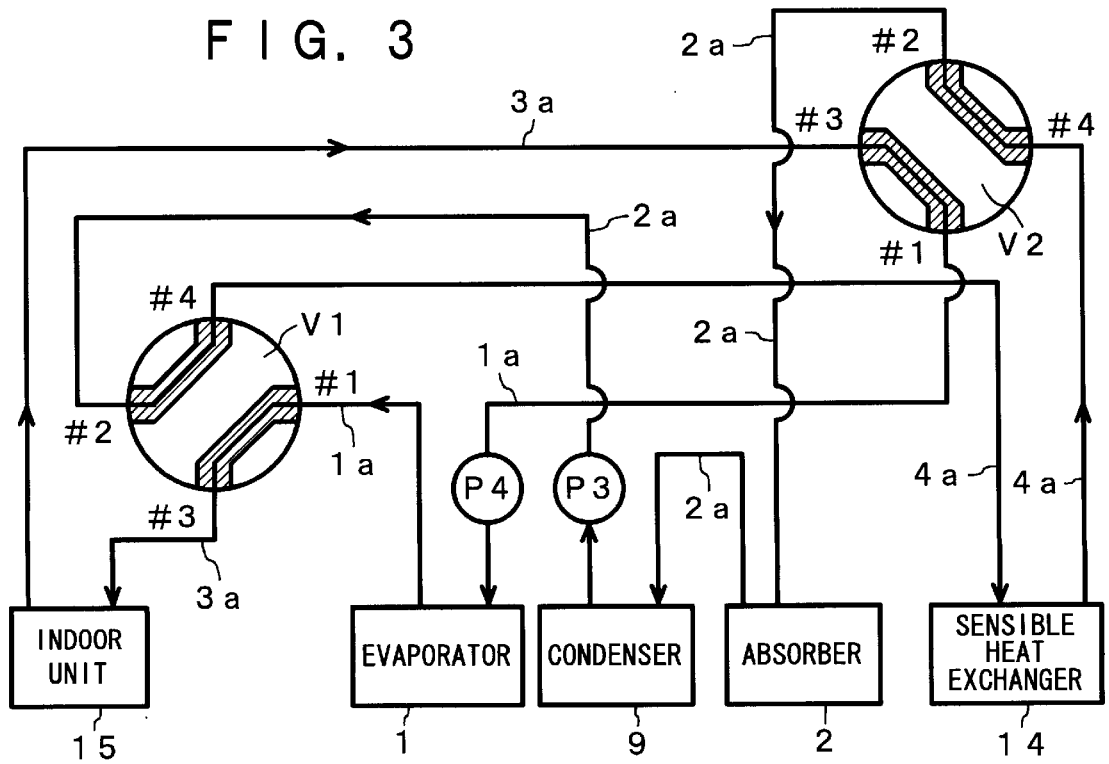
FIG. 3 is a diagram showing the piping arrangement with the four-way valves operating the refrigerating mode in the refrigerating/heating apparatus according to the present invention.

In the refrigerating mode of the absorption refrigerating and heating apparatus of the present invention shown in FIG. 3, the first and second four-way valve V1 and V2 are respectively actuated so that the No. 1 and No. 3 openings are communicated to each other and the No. 2 and No. 4 openings are communicated to each other. Accordingly, the chilled water in the tube 1a of the evaporator 1 is fed to the tube 3a in the indoor unit 15 for cooling the room. When the chilled water cooled by the action of the refrigerant in the evaporator 1 is fed to the indoor unit 15, the cooling air is blown into the room by the blowing fan 10.

If the thermal load is abruptly changed by e.g. setting the heating unit to a lower temperature with the outside air temperature remaining at a given degree in the thermodynamic heating mode, the heat pump circulation may be disabled. In the thermodynamic heating action, the circulation of the refrigerant and the absorbent solution is effected by a pressure difference between the high pressure side with the condenser 9 and the low pressure side with the evaporator 1 and the absorber 2. When the setting temperature is lowered thus to abruptly decrease the thermal load, the input of heat energy to a the regenerator is controlled to be reduced thus declining the supply of the diluted solution to the regenerator 3. As the result, the pressure in the condenser 9 as well as the pressure difference is decreased thus disabling the thermodynamic heating action.

For prevention of the above incident, the pressure sensor PS9 is mounted for detecting the pressure in the condenser 9. When the pressure in the condenser 9 is declined to lower than the reference level, the valves are activated to shift from the thermodynamic heating mode to the direct flame heating mode. With the pressure sensor PS1 mounted in the evaporator 1 for detecting the internal pressure, the heating mode may be shifted to the direct flame heating mode when a difference of outputs or pressures between the two pressure sensors PS1 and PS9 is detected to be less than a predetermined reference value.

The pressure in the condenser 9 is a function of the outside air temperature and the setting temperature on the indoor unit. It is hence possible to shift from the thermodynamic heating mode to the direct flame heating mode when the operation point of the condenser determined and expressed by a combination of the outside air temperature and the setting temperature is out of a predetermined range.

Figure 7:
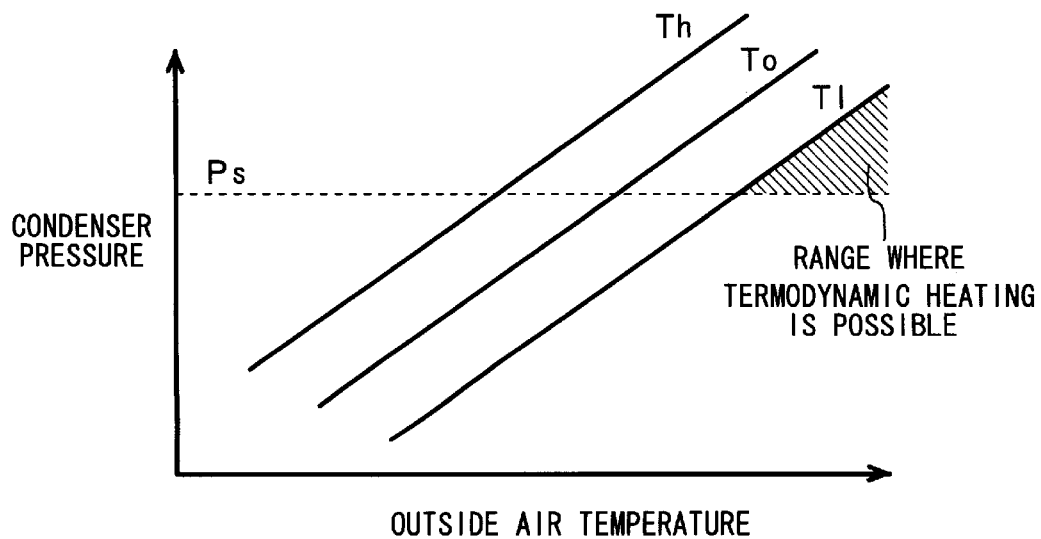
FIG. 7 is a characteristic graph showing the relation between the pressure in a condenser and the outside air temperature.

FIG. 7 is an explanatory diagram showing the operation point of the condenser. The pressure in the condenser 9 (along the vertical axis) is expressed as a function of the outside air temperature (along the horizontal axis) and the setting temperature on the indoor unit 15. When the setting temperature is Tl<TO<Th, respectively, the functional relationship between them are expressed as the traces of Tl, TO, and Th shown in FIG. 7. For maintaining the effectiveness of the thermodynamic heating action, the condenser pressure has to be higher than a threshold Ps. When the setting temperature is Tl, the range in which the thermodynamic heating action is possible or its operation point falls is defined by the hatching, on the right of the trace of T1 (on the higher temperature side) and above the threshold Ps (on the higher pressure side).

According to the present invention, the flows of the refrigerant and the absorbent solution are identical in both the refrigerating mode and the thermodynamic heating mode. There is no need of switching the flows of the refrigerant and the absorbent solution between the refrigerating mode and the heating mode, while the flows of the cooling water and the chilled water are controlled by the action of a pair of four-way valves. This permits the absorption refrigerating/heating apparatus to be simplified in construction and used as a compact home air conditioner. Also, the separation of the refrigerant from the absorption solution is not required when switching between the refrigerating mode and the heating mode, hence contributing to the promptness and high efficiency of the mode switching action.

In the common heating mode, the thermodynamic heating action is used for heating with a higher efficiency. When the outside air temperature extremely drops down thus to disturb the pumping of heat and almost disable the thermodynamic heating action, the thermal load is abruptly changed to lower the pressure in a high pressure line such as the condenser or to decrease the pressure difference between the high pressure line and a low pressure line such as an evaporator to less than the reference level, or if the combination of the outside air temperature and the thermal load is out of the setting operation range, the heating action can be shifted to the direct flame heating mode simply and readily for maintaining a desired degree of the heating temperature.

The absorption refrigerating/heating apparatus of the present embodiment may, however, face a trouble that the start of the thermodynamic heating action is delayed more or less when shifted back from the direct flame heating mode. In the direct flame heating mode, most of the refrigerant is fed back to the regenerator thus lowering the amount of the refrigerant in the condenser. This prevents the evaporator from receiving a desired amount of the refrigerant from the condenser upon shifting to the thermodynamic heating mode. As the result, the thermodynamic heating action will not be able to reach an expected stable operation before the evaporator has received the desired amount of the refrigerant from the condenser.

In particular, when the direct flame heating mode is implemented in an arrangement where the refrigerant is transferred from the evaporator to the regenerator for decreasing the concentration of the absorbent in the solution to increase the thermal efficiency in the regenerator, the refrigerant in the evaporator is likely to be short.

When the outside air temperature drops to decline the heating capability, the thermodynamic heating action is stopped by closing the tube 9b for passing the refrigerant from the condenser 9 to the evaporator 1 and the tube 7a for passing the concentrated solution from the regenerator 3 to the absorber 2. In the present embodiment, at least either the refrigerant in the evaporator 1 or the absorbent solution in the absorber 2 is conveyed through the passageway 1c or 7b to the regenerator 3 by the action of the pump P1 or P2 to lower the concentration of the absorbent in the solution in the regenerator 3. Then, the switching valve 17 is opened to feed back the refrigerant liquefied in the condenser 9 through the bypass passage 9a to the regenerator 3. This assists to decrease the heat quantity from the burner 7 to heat the cooling water in the tube 2a up to a target temperature as will be described later in more detail.

Figure 4:
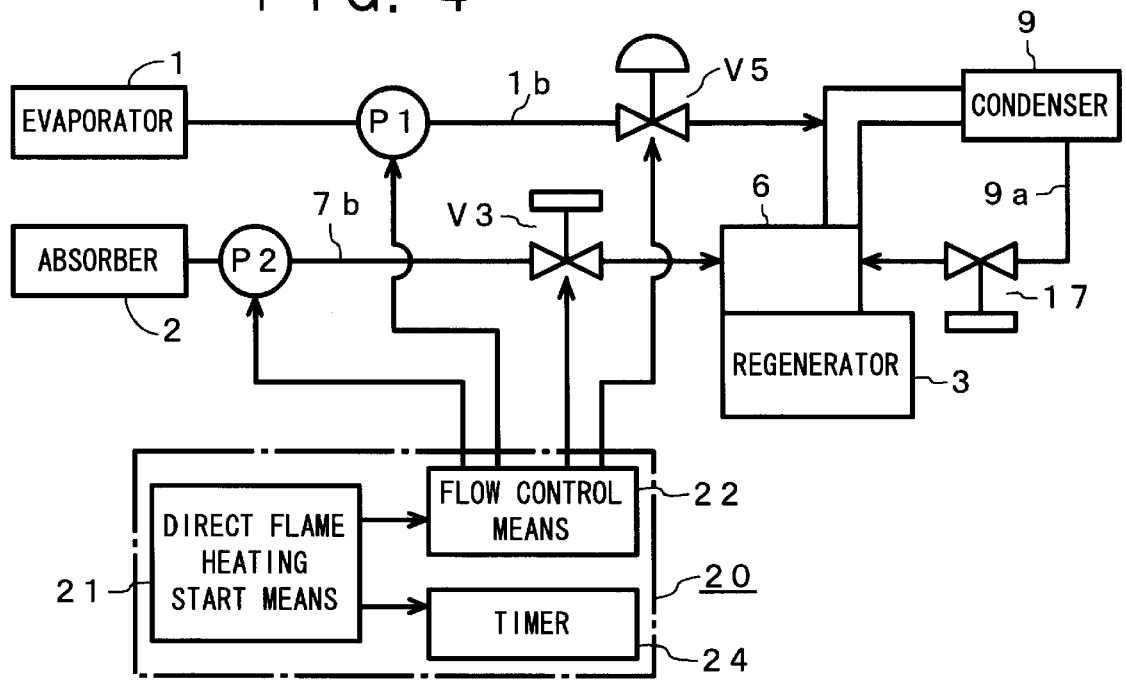
FIG. 4 is a schematic block diagram of a control device which includes pumps and valves for switching to the direct flame heating mode in the refrigerating/heating apparatus shown in FIG. 1.

FIG. 4 is a block diagram showing the control device 20 for controlling the pumps and valves when the heating mode is shifted to the direct flame heating mode. Upon the direct flame heating mode being selected by a (refrigerating/heating) operation mode determining means, explained later, or a manual action, a direct flame heating starting means 21 starts up a flow controlling means 22. The flow controlling means 22 switches on at least one of the pumps P1 and P2 and fully opens the corresponding valve V5 and/or V3 to deliver the refrigerant and/or solution to the regenerator 3 within the shortest possible time. The time required for delivering the refrigerant and/or solution to the regenerator 3 or the operating time of the pump P1 or P2 is determined by a timer 24. As the timer 24 is set to a desired period, the flow of the refrigerant and/or solution is so adjusted that the liquid level in the regenerator 3 stays lower than the inlet of the refrigerant from the condenser 9 through the passage 9a to the regenerator 3 or the rectifier 6. The liquid level may be monitored with a level meter (not shown) mounted in the regenerator 3 or the rectifier 6.

Figure 6:
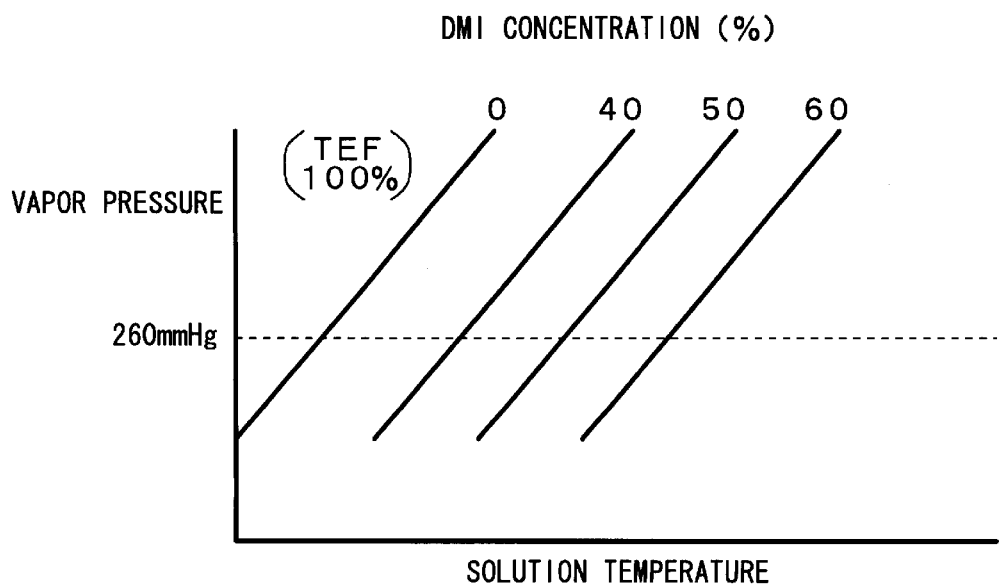
FIG. 6 is a characteristic graph showing the relation between the temperature of a solution and the pressure of a steam with the concentration of an absorbent in the solution being changed.

The improvement of the thermal efficiency in the direct flame heating mode by decreasing the concentration of the absorbent in the solution in the regenerator 3 is now explained. FIG. 6 is a Dühring chart showing the relation between the temperature and the concentration of the absorbent (DMI derivative) in the solution with the condensation pressure of (TFF) refrigerant vapor. As apparent from the chart, the temperature of the solution can be kept lower to maintain the inside of the condenser 9 at a given pressure (for example, 260 mmHg) when the concentration of the absorbent is lower. When the concentration of the absorbent in the solution is kept low to decrease the temperature of the solution required for maintaining a volume of the refrigerant vapor generated in the regenerator 3, the thermal efficiency in the direct flame heating mode will be improved. As the temperature of the solution is kept low, the fuel used in the burner 7 is saved, the temperature of exhaust gas is lowered, and the radiant heat and the spontaneous radiation from the regenerator or the solution therein are minimized. Accordingly, the thermal efficiency in the direct flame heating mode will be improved as the whole.

It was also found by the inventors that the temperature of the solution in the regenerator can be remained lower when the absorbent is delivered supplementarily after fully conveying the refrigerant to the regenerator than the opposite. Although the description is made where the refrigerant is circulated back from the condenser to the regenerator to start the direct flame heating mode after at least one of the refrigerant and the absorbent solution is delivered to the regenerator, it will be possible to start the circulation of the refrigerant and thus the direct flame heating mode upon starting of delivering the refrigerant and the absorbent solution to the regenerator. The condenser may be substituted by a dephlegmator or a partial condenser.

Figure 5:
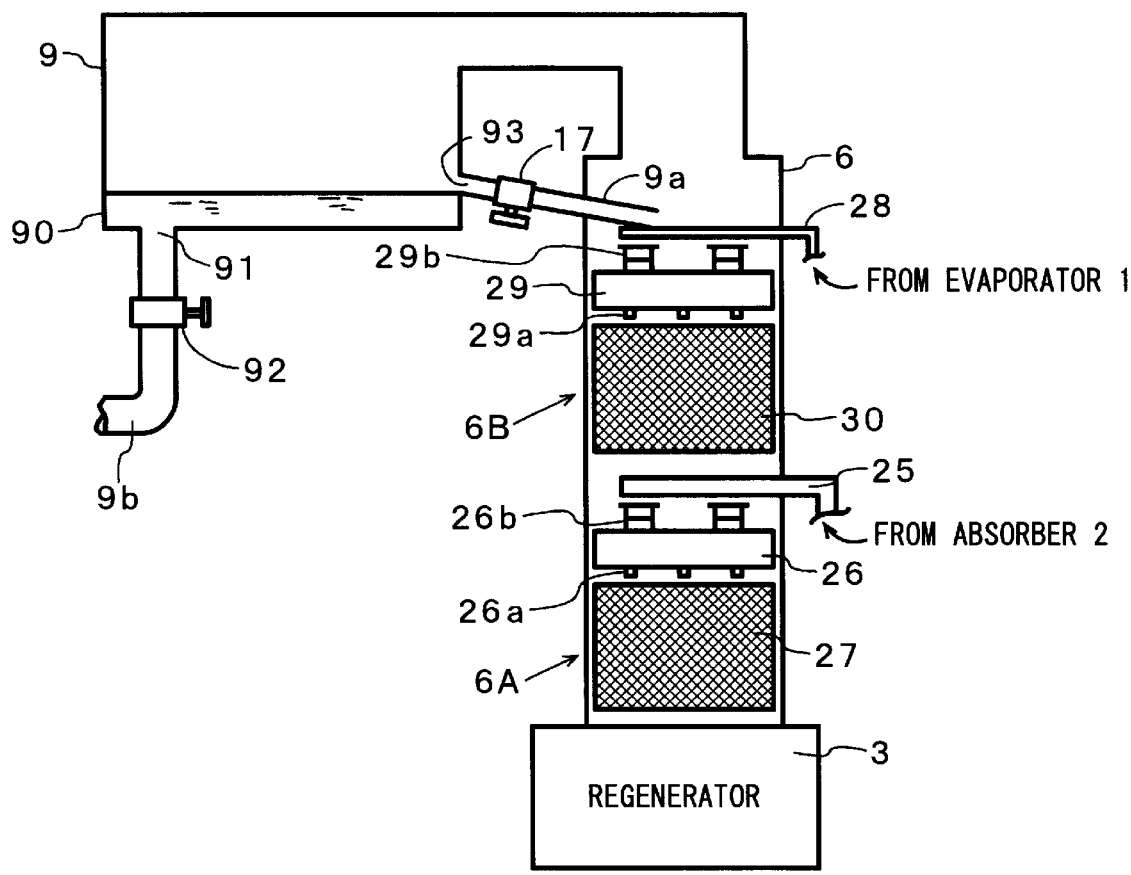
FIG. 5 is a diagram of a principle part of the refrigerating/heating apparatus of the embodiment according to the present invention.

The structures of the regenerator 3, the rectifier 6, and the condenser 9 suited for the embodiment of the present invention are explained in more detail. FIG. 5 is a cross sectional view of a primary section for separating the solution and the refrigerant from each other or for regeneration of them, in which like components are denoted by like numerals as those shown in FIGS. 1 and 2. The rectifier 6 mounted on the top of the regenerator 3 has a two-stage construction consisting of a lower stripping stage 6A and an upper enriching stage 6B. The stripping stage 6A comprises a receiver 26 for receiving drops of the diluted solution from a tube 25 connected to the absorber 2 and a contact net (filler) 27 located below the receiver 26. Similarly, the enriching stage 6B comprises a receiver 29 for receiving drops of the refrigerant from a tube 28 connected to the evaporator 1 and a contact net (filler) 30 located below the receiver 29.

The two receivers 26 and 29 have drop nozzles 26a and 29a for releasing the diluted solution and the refrigerant, respectively, and upward passages or vapor apertures 26b and 29b for upwardly passing the refrigerant vapor, respectively. The distal end or an outlet of a return passage 9a connected with the condenser 9 is provided extending above the receiver 29 of the enriching stage 6B for providing drops of the refrigerant returned from the condenser 9. The diluted solution and the refrigerant released from their respective drop nozzles 26a and 29b then come into direct contact with the contact nets 27 and 30, respectively, for accelerating the separation of the absorbent from the solution. The contact nets 27 and 30 are made of e.g. a net shape of a filler material. This construction permits the refrigerant vapor to be first separated from the diluted solution in the stripping stage 6A and then in the enriching stage 6B at a higher purity before conveyed to the condenser 9.

The condenser 9 has a lower tank 90 thereof provided at the bottom with an outlet 91 for delivering the refrigerant to the evaporator 1. The outlet 91 is communicated to the tube 9b with the valve 92. Also, another (circulation) outlet 93 to the return passage 9a is provided in a side wall of the lower tank 90 for circulating back the refrigerant. The return passage 9a of the condenser 9 extending to over the receiver 29 of the enriching stage 6B is tilted to an angle, considering the resistance in the passage, so that the refrigerant freely runs along the return passage 9a and drops or drains on the receiver 29.

In the direct flame heating mode, as described above, the refrigerant is delivered from the evaporator 1 to the regenerator 3 or the rectifier 6 and its amount remaining in the evaporator 1 is minimized. If bubbles are generated in the passage 9b between the condenser 9 and the evaporator 1 and enter the evaporator 1, the internal pressure of the evaporator 1 is increased thus disturbing the absorption refrigerating cycle action. It is thus preferred that the passage 9b is constantly filled with the refrigerant and that the absorption refrigerating cycle action is quickly commenced by passing the refrigerant from the condenser 9 to the evaporator 1 when the action is shifted from the direct flame heating mode to the thermodynamic heating mode.

In the embodiment of the present invention, the outlet 93 is spaced by such a distance from the bottom of the lower tank 90 that the condenser 9 is always filled with a proper amount of the refrigerant. As the level of the refrigerant stays at least up to the location of the output 93 in the condenser 9, the shift from the direct flame heating mode to the thermodynamic heating mode can be made without delay. While the refrigerant saved in the condenser 9 is instantly delivered to the evaporator 1 by the opening action of the valve 92 upon shifting from the direct flame heating mode to the thermodynamic heating mode, an extra of the refrigerant recovered in the condenser 9 is continuously fed to the evaporator 1 with the switching valve 17 being closed. When the thermodynamic heating mode is shifted to the direct flame heating mode, the valve 92 is closed and the switching valve 17 is opened to return the refrigerant from the condenser 9 to the rectifier 6.

It is true that the heating capability stays low just after the start of the thermodynamic heating mode if a dose of the absorbent is mixed in the refrigerant. In the embodiment, as the refrigerant kept at high purity in the condenser 9 is instantly transferred to the evaporator 1, the thermodynamic heating mode can yield a higher heating power immediately after shifted from the direct flame heating mode. Although the refrigerant is returned from the condenser 9 to the receiver 29 of the enriching stage 6B in the embodiment shown, but it may be received by the receiver 26 of the stripping stage 6A.

As set forth above, the present embodiment allows the condenser to be constantly filled with a given amount of the refrigerant at high purity in the direct flame heating mode and thus to supply the evaporator with a desired amount of the refrigerant immediately after the heating action is shifted to the thermodynamic heating mode which thus can quickly be activated to a normal operating performance. The returning of the refrigerant from the condenser to the regenerator is realized by spontaneous drop from the return passage on the receiver 29 or 26 while the mixing of the absorbent with the refrigerant in the direct flame heating mode is minimized. Since the refrigerant in the evaporator is kept at a high purity, the concentration of the absorbent in the evaporator can readily be decreased after shifting from the direct flame heating mode to the thermodynamic heating mode thus allowing the thermodynamic heating mode to quickly reach its normal operating performance. Also, most of the refrigerant is transferred from the evaporator to the regenerator in the direct flame heating mode, hence improving the thermal efficiency in the apparatus. In particular, the refrigerant can quickly be conveyed from the condenser to the evaporator upon shifting to the thermodynamic heating mode from the direct flame heating mode.

What is claimed is:

1. An absorption refrigerating/heating apparatus comprising:

an evaporator for accommodating a refrigerant;

an absorber for accommodating a solution which includes an absorbent for absorbing a refrigerant vapor generated in the evaporator and producing absorption heat;

a regenerator for heating a portion of the solution passed from the absorber to extract the refrigerant vapor for recovery of the concentration of the absorbent in the solution;

a condenser for condensing the refrigerant vapor extracted and passing it to the evaporator;

a first tube mounted across the evaporator for passing a flow of chilled water which is cooled down with the refrigerant;

a second tube mounted across the absorber and the condenser for passing a flow of cooling water which is heated by the solution in the absorber and the refrigerant vapor in the condenser;

an indoor unit equipped in a room to be airconditioned, and having a third tube extending thereacross for selectively passing one of the chilled water and the cooling water, which indoor unit provides a blow of conditioning air to the room;

a sensible heat exchanger having a fourth tube extending thereacross for selectively passing the other of the chilled water and the cooling water, which provides exchange of heat between the other of the chilled water and the cooling water and the outside air;

a first four-way valve having four openings each of which is connected to each of one ends of the first through fourth tubes;

a second four-way valve having four openings each of which is connected to each of the other ends of the first through fourth tubes, in which the first and second four-way valves are switched for connecting the first tube and the second tube to the third tube and the fourth tube respectively in a cooling operation, while to the fourth tube and the third tube respectively in a heating operation; and a return passage for fluidly connecting between the condenser and the regenerator, in which in the heating operation, the refrigerant vapor generated in the regenerator is circulated from the condenser via the return passage to the regenerator to shift a thermodynamic heating operation to a direct flame heating mode.

2. An absorption refrigerating/heating apparatus according to claim 1, further comprising a means for allowing the return passage to circulate the refrigerant vapor when any of four conditions that the outside air temperature is less than a first predetermined degree, that the pressure in the condenser is less than a second predetermined value, that a pressure difference between pressures in the condenser and the evaporator is less than a third predetermined value, and that the operating point defined by a combination of the outside air temperature and the setting temperature on the indoor unit is out of a predetermined range is satisfied.

3. An absorption refrigerating/heating apparatus according to claim 2, wherein a means for separating the absorbent solution from a mixture of the refrigerant vapor and absorbent solution generated in the regenerator is mounted between the regenerator and the condenser.

4. An absorption refrigerating/heating apparatus according to claim 1, wherein a refrigerant circulation outlet of the return passage for circulating it back from the condenser to the regenerator is located higher than another refrigerant outlet for returning it back from the condenser to the evaporator.

5. An absorption refrigerating/heating apparatus according to claim 1, further comprising a rectifier mounted on the top of the regenerator for further separating the absorbent solution from a mixture of the refrigerant vapor and absorbent solution generated in the regenerator, and which rectifier consisting of a lower stripping stage and an upper enriching stage, wherein the refrigerant vapor generated in the regenerator is passed across the rectifier to the condenser, and the return passage has a drain opening located lower than the refrigerant circulation outlet in the condenser and arranged opening above the stripping stage.

6. An absorption refrigerating/heating apparatus according to claim 1, further comprising a bleeding line for passing a portion of the refrigerant from the evaporator to the regenerator.

7. An absorption refrigerating/heating apparatus according to claim 6, further comprising a means for almost fully opening the bleeding line, in the direct flame heating mode, to feed the refrigerant from the evaporator to the regenerator for decreasing the concentration of the absorbent in the solution in the regenerator to a lower level than that in a thermodynamic heating action.

8. An absorption refrigerating/heating apparatus according to claim 1, wherein the chilled water and the cooling water are substantially identical to each other in the properties.

9. An absorption refrigerating/heating apparatus having an evaporator for accommodating a refrigerant, an absorber for accommodating a solution which includes an absorbent for absorbing a refrigerant vapor generated in the evaporator, a regenerator for heating a portion of the solution to extract the refrigerant vapor for recovery of the concentration of the absorbent in the solution, and a condenser for condensing the refrigerant vapor extracted and passing it to the evaporator, in which the operation is selected from a refrigerating mode for feeding a chilled water cooled down in the evaporator to an indoor unit, a thermodynamic heating mode for feeding a cooling water heated at least in the condenser to the indoor unit, and a direct flame heating mode for directly circulating back the refrigerant from the condenser to the regenerator, the improvement comprising:

a return passage for directly circulating back the refrigerant from the condenser to the regenerator; and a switching means for opening the return passage to form a closed circulation loop of the refrigerant and to shift the operation to the direct flame heating mode for heating the cooling water running across the condenser with the circulated refrigerant, in which the refrigerant circulation outlet connected to the return passage from the condenser to the regenerator is located higher than another refrigerant outlet for passing back the refrigerant from the condenser to the evaporator.

10. An absorption refrigerating/heating apparatus according to claim 9, further comprising a rectifier mounted on the top of the regenerator for further separating the absorbent solution from a mixture of the refrigerant vapor and absorbent solution generated in the regenerator and which rectifier consisting of a lower stripping stage and an upper enriching stage, wherein the refrigerant vapor generated in the regenerator is passed across the rectifier to the condenser, and the return passage has a drain opening located lower than the refrigerant circulation outlet in the condenser and arranged opening above the stripping stage.

11. An absorption refrigerating/heating apparatus according to claim 9, further comprising a bleeding line for passing a portion of the refrigerant from the condenser to the rectifier.

12. An absorption refrigerating/heating apparatus according to claim 11, further comprising a means for almost fully opening the bleeding line, in the direct flame heating mode, to feed the refrigerant from the evaporator to the regenerator for decreasing the concentration of the absorbent in the solution in the regenerator to a lower level than that in a thermodynamic heating action.

13. An absorption refrigerating/heating apparatus according to claim 12, wherein the chilled water and the cooling water are substantially identical to each other in the properties.

* * * * *

UNITED STATES PATENT AND TRADEMARK OFFICE
CERTIFICATE OF CORRECTION

PATENT NO.:     5,901,567
DATED     :     May 11, 1999
INVENTOR(S):     Akira SUZUKI et al.

It is certified that error appears in the above-identified patent and that said Letters Patent is hereby corrected as shown below:

Item [30] the second foreign application number 7-094812 should be corrected as follows:

--9-094812--

Signed and Sealed this

Eighth Day of February, 2000

Attest:

Q. TODD DICKINSON

Attesting Officer      Commissioner of Patents and Trademarks